United States Patent [19]

Miyama

[11] Patent Number: 5,000,149
[45] Date of Patent: Mar. 19, 1991

[54] METHOD FOR CONTROLLING IGNITION TIMING OF AN INTERNAL COMBUSTION ENGINE

[75] Inventor: Shuji Miyama, Musashimurayama, Japan

[73] Assignee: Fuji Jukogyo Kabushiki Kaisha, Tokyo, Japan

[21] Appl. No.: 531,232

[22] Filed: May 31, 1990

[30] Foreign Application Priority Data

Jun. 9, 1989 [JP] Japan .................................. 1-147104

[51] Int. Cl.$^5$ .............................................. F02P 5/15
[52] U.S. Cl. ................................................. 123/425
[58] Field of Search ........................................ 123/425

[56] References Cited

U.S. PATENT DOCUMENTS

| 4,630,584 | 12/1986 | Higashiyama et al. | 123/425 |
| 4,715,342 | 12/1987 | Nagai | 123/425 |
| 4,736,723 | 4/1988 | Nagai | 123/425 |
| 4,934,327 | 6/1990 | Hidaka | 123/425 |

FOREIGN PATENT DOCUMENTS 62-75073  4/1987  Japan .................................. 123/425

Primary Examiner—Andrew M. Dolinar
Attorney, Agent, or Firm—Martin A. Farber

[57] ABSTRACT

An ignition controlling system has a first memory storing a plurality of upper limit ignition timings and lower limit ignition timings each of which is a maximum advance timing for high-octane gasoline and low-octane gasoline without causing knocking, and storing a plurality of maximum advance ignition timings. A second memory stores a coefficient for determining a dividing point between said upper and lower limit ignition timings. The coefficient is rewritten in accordance with occurrence of the knocking of the engine. A learning ignition timing is calculated from the upper and lower limit ignition timings and the coefficient derived from the first and second memory.

4 Claims, 5 Drawing Sheets

METHOD FOR CONTROLLING IGNITION TIMING OF AN INTERNAL COMBUSTION ENGINE

BACKGROUND OF THE INVENTION

The present invention relates to a method for controlling ignition timing of an internal combustion engine for an automobile through a learning operation.

A learning control system for correcting the ignition timing has been proposed. The control system is adapted to advance the ignition timing so as to produce a maximum torque as long as a level of an engine knock does not exceed a tolerable level. If the knock occurs, the control system operates to retard the ignition timing by a predetermined value. A maximum advance ignition timing for producing the maximum torque without causing knocking, depends on a type of the engine and on an octane number of fuel used in the engine. Namely, when high-octane gasoline or a mixture thereof with low-octane gasoline is used, the ignition timing is advanced from that of the low-octane gasoline for increasing the torque. Since the octane number varies with the quality of the fuel, the ignition timing varies accordingly so that it is necessary to correct the ignition timing through a learning control system.

The maximum advance ignition timing is advanced as the octane number of the fuel increases. However, it is not advisable to advance the timing only in accordance with the octane number, over a limit ignition timing for producing the maximum torque dependent on engine operating conditions because the torque is reduced.

Japanese Patent Application Laid-Open 61-157768 (U.S. Pat. No. 4,736,723) discloses a learning control system for the ignition timing control. In the system, a memory storing maximum advance ignition timings and lower limit ignition timings is provided, arranged in accordance with engine speed and intake passage pressure. The difference between a maximum advance ignition timing and a lower limit ignition timing derived from the memory is calculated. A correcting value is obtained by multiplying the difference by a coefficient as a dividing point of the differential period between the maximum advance ignition timing and the lower limit ignition timing. The ignition timing is obtained by adding the correcting value to the lower limit ignition timing. However, the calculated ignition timing does not coincide with a theoretically desired maximum timing. For example, in a low engine speed range the timing is advanced too much from the desired maximum timing, and in a high engine speed range the timing is largely retarded. Consequently, the ignition timing is not properly controlled so as to produce a maximum torque by selected fuel.

In addition, since the ignition timing is determined at the dividing point of the differential period between the maximum advance timing and the lower limit ignition timing, the ignition timing can not be advanced over a limit.

SUMMARY OF THE INVENTION

The object of the present invention is to provide a method which may determine ignition timing so as to converge real ignition timing to a desired maximum ignition timing in accordance with engine operating conditions and with octane number of gasoline used in an engine without causing knocking and fluctuation of the timing.

According to the present invention, there is provided a method for controlling ignition timing of an internal combustion engine having an ignition timing control system with a first memory storing a plurality of upper limit ignition timings and lower limit ignition timings each of which is a maximum advance timing for high-octane gasoline and low-octane gasoline without causing knocking, and storing a plurality of maximum advance ignition timings, and a learning control system having a second memory storing a coefficient for determining a value in the differential period between the upper and lower limit ignition timings.

The method comprises deriving an upper limit ignition timing, a lower limit ignition timing, a maximum advance ignition timing, and a coefficient from the first and second memories in accordance with engine operating conditions, rewriting the derived coefficient in accordance with occurrence of knocking of the engine, calculating a learning ignition timing from the derived upper and lower limit ignition timings and the coefficient, comparing the calculated learning ignition timing with the derived maximum advance quantity for determining a smaller advancing timing, and determining the smaller advancing timing as an ignition timing.

Rewriting the coefficient in the advancing direction is stopped when the coefficient becomes one.

In an aspect of the invention, the engine operating conditions are engine speed and load on the engine.

The present invention provides further a system for controlling ignition timing of an internal combustion engine having an ignition timing control system with a first memory storing a plurality of upper limit ignition timings and lower limit ignition timings each of which is a maximum advance timing for high-octane gasoline and low-octane gasoline without causing knocking, and storing a plurality of maximum advance ignition timings, and a learning control system having a second memory storing a coefficient for determining a value in the differential period between said upper and lower limit ignition timings. The system comprises means for deriving an upper limit ignition timing, a lower limit ignition timing, a maximum advance ignition timing, and a coefficient from the first and second memories in accordance with engine operating conditions, rewriting means for rewriting the derived coefficient in accordance with occurrence of knocking of the engine, a calculator for calculating a learning ignition timing from the derived upper and lower limit ignition timings and the coefficient, a comparator for comparing the calculated learning ignition timing with the derived maximum advance quantity for determining a smaller advancing timing as an ignition timing.

The other objects and features of this invention will become understood from the following description with reference to the accompanying drawings.

DETAILED DESCRIPTION OF THE PREFERRED EMBODIMENT

Figure 1:
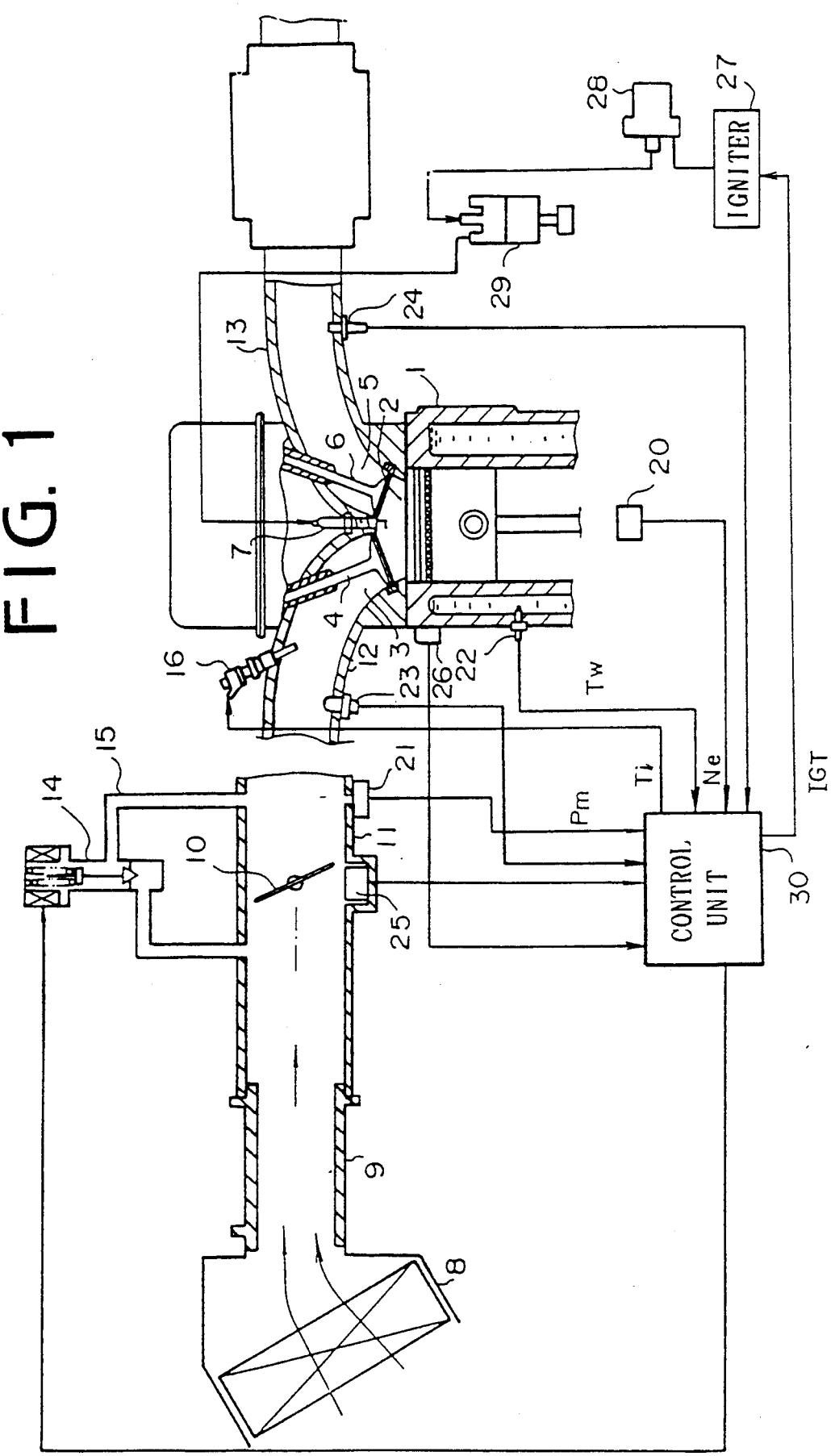
FIG. 1 is a schematic illustration of an engine to which the present invention is applied.

Referring to FIG. 1, an engine 1 has a throttle valve 10 provided in a throttle body 11 communicated with an air cleaner 8 through an intake pipe 9. The throttle body 11 is communicated with an intake manifold 12 which is communicated with a combustion chamber 2 of each cylinder in the engine 1 through an intake port 3 and an intake valve 4. A bypass 15 having an idle speed control (ISC) valve 14 is provided on the throttle valve 10. A spark plug 7 is located in each combustion chamber 2 and a multiple-point fuel injector 16 is provided in the intake manifold 12 adjacent each intake port 3. Exhaust gases from the engine 1 are discharged through an exhaust port 5, an exhaust valve 6 and an exhaust manifold 13. The engine 1 is provided with a crank angle sensor 20, a pressure sensor 21 for detecting pressure in the intake pipe 11 downstream of the throttle valve 10, a coolant temperature sensor 22, an intake air temperature sensor 23, an $O_2$-sensor 24 for detecting oxygen concentration of the exhaust gases in the exhaust manifold 13, a throttle position sensor 25 and a knock sensor 26. The output signals of the sensors from 20 to 26 are applied to a control unit 30 which applies a fuel injection signal to the injector 16, an idle signal to the ISC valve 14 and an ignition signal to the spark plug 7 through an igniter 27, an ignition coil 28 and a distributor 29. An engine speed Ne is calculated based on a crank angle signal from the crank angle sensor 20 and an intake pressure Pm is calculated based on the signal from the pressure sensor 21, which are used for calculating a basic injection pulse width Tp. The basic injection pulse width Tp is corrected in accordance with a coolant temperature Tw from the coolant temperature sensor 22, an intake air temperature Ta from the intake air temperature sensor 23 and a feedback signal from the $O_2$-sensor 24. The fuel injector 16 injects a quantity of fuel which corresponds to a corrected injection pulse width Ti.

On the other hand, it is determined that the engine 1 is idling in accordance with a throttle opening degree detected by the throttle position sensor 25, or with the idle signal of an idle switch. The opening degree of the ISC valve 14 is adjusted to control the engine idling speed.

Figure 2:
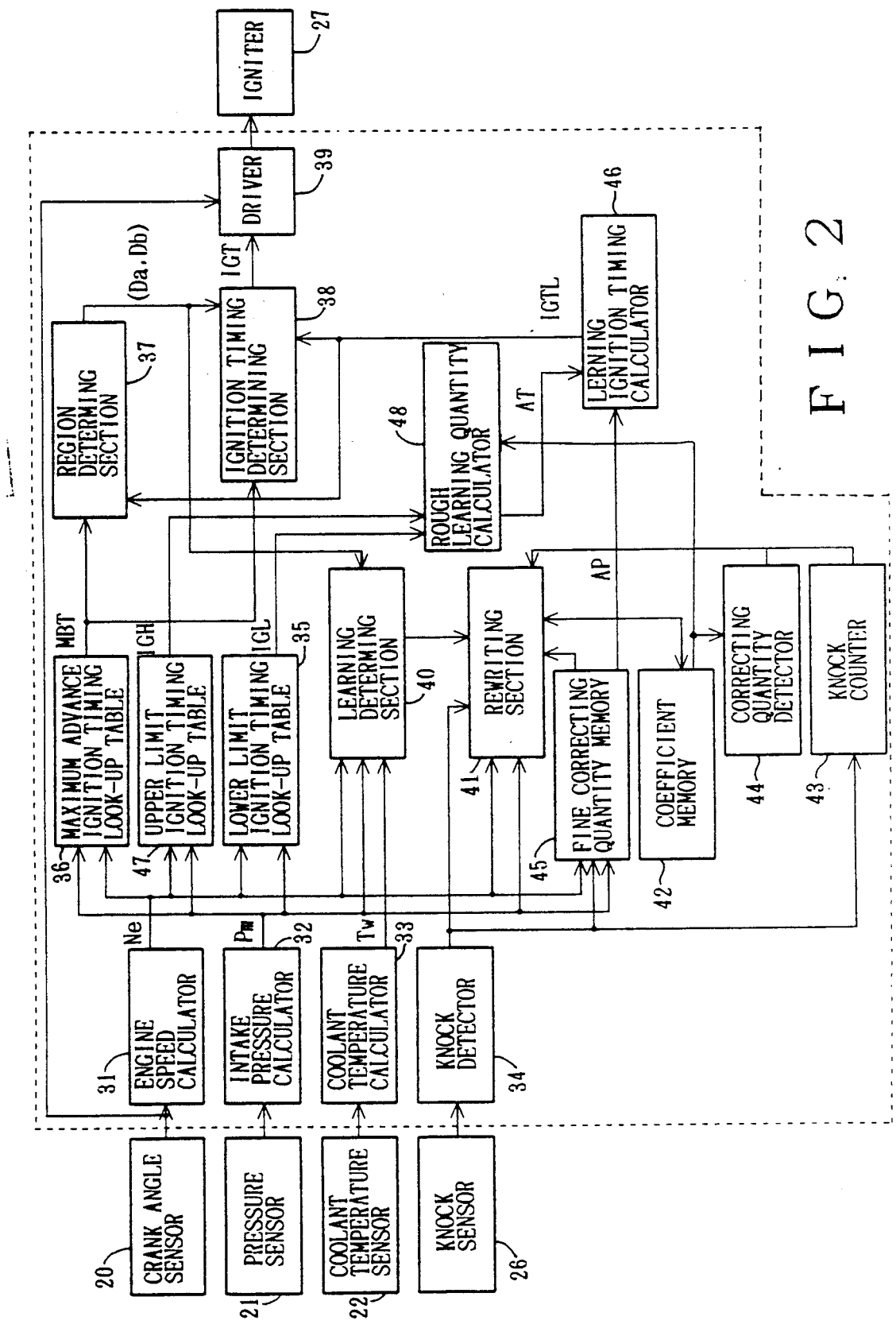
FIG. 2 shows a block diagram of a control system according to the present invention.

Referring to FIG. 2, the control unit 30 has an engine speed calculator 31, an intake pressure calculator 32 and a coolant temperature calculator 33 for calculating the engine speed Ne, the intake pressure Pm and the coolant temperature Tw based on the output signals of the crank angle sensor 20, the pressure sensor 21 and the coolant temperature sensor 22, respectively. A knock detector 34 is provided to produce a knock signal when the knock sensor 26 detects a knocking of the engine.

Figure 5:
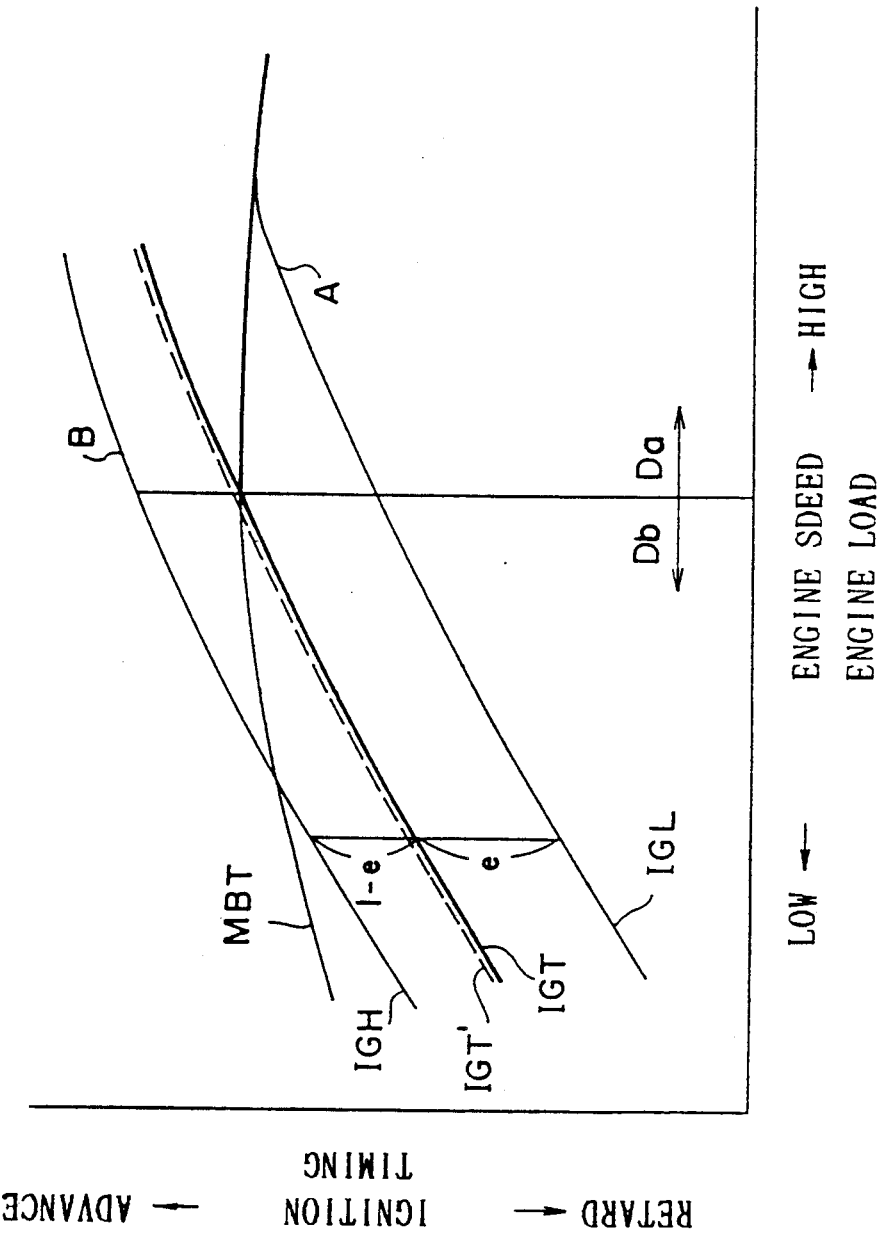
FIG. 5 is a graph showing characteristics of ignition timings in accordance with engine speed and engine load.

The engine speed Ne and the intake pressure Pm are fed to a maximum advance ignition timing look-up table 36, an upper limit ignition timing look-up table 47 and a lower limit ignition timing look-up table 35. The maximum advance ignition timing table 36 stores a plurality of maximum advance ignition timings MBT, arranged in accordance with the engine speed Ne and the intake pressure Pm. The maximum advance ignition timing MBT is an ignition timing for obtaining a maximum torque. The lower limit ignition timing look-up table 35 and the upper limit timing look-up table 47 store a plurality of lower limit ignition timings IGL and a plurality of upper limit ignition timings IGH, respectively, arranged in accordance with the engine speed Ne and the intake air pressure Pm. The lower limit ignition timing IGL is a most advanced timing for low-octane gasoline and the upper limit ignition timing IGH is a most advanced timing for high-octane gasoline as long as knocking does not occur. The ignition timings MBT, IGL and IGH advance with an increase of the engine speed Ne and with an increase of the engine load represented by the intake air pressure Pm as shown in FIG. 5. A theoretically desired maximum ignition timing IGT' for obtaining a maximum torque is parallelly shifted in the advancing direction from a line A to line B with an increase in the octane number of the fuel.

The maximum advance ignition timing MBT and a learning ignition timing IGTL obtained through the learning procedure, the operation of which will be later described, are fed to a region determining section 37. In the region determining section 37, the maximum advance ignition timing MBT and the learning ignition timing IGTL are compared with one another to select one of regions Da and Db shown in FIG. 5. When the maximum advance ignition timing MBT is advanced more than the learning ignition timing IGTL (MBT>IGTL), the region Db is selected. To the contrary, when the maximum advance ignition timing MBT is retarded more than the learning ignition timing IGTL (MBT≦IGTL), the region Da is selected.

The output signal of the region determining section 37, the maximum advance ignition timing MBT and the learning ignition timing IGTL are fed to an ignition timing determining section 38. When the region Db is selected, the learning ignition timing IGTL is selected as a real ignition timing IGT. On the other hand, in the region Da, the maximum advance ignition timing is selected as the ignition timing IGT. Namely, the ignition timing having a smaller advancing time is selected from the both regions Da and Db.

The ignition timing IGT is applied to the igniter 27 through a driver 39 so as to ignite the spark plug 7 at the determined timing in accordance with the crank angle signal.

The control unit 30 further has a system for obtaining the learning ignition timing IGTL through learning. A learning determining section 40 is applied with the output signal of the region determining section 37, the engine speed Ne, the intake pressure Pm and the coolant temperature Tw to determine whether the engine operating conditions are proper for performing the learning operation. The learning operation is executed when the vehicle is driven in a warmed up state in a high engine load range and a low engine speed range where the knocking can be accurately detected, and when the region Db is selected. The output signal of the determining section 40 is applied to a rewriting section 41 to which the engine speed Ne, the intake pressure Pm and the knock signal are further fed. The rewriting section 41 selectively performs a coefficient learning operation and a correcting quantity learning operation in accordance with the engine operating conditions. A coefficient e stored in a coefficient memory 42 is fed to a rough learning quantity calculator 48 where a rough learning quantity AT is calculated as follows.

$$AT = IGL + e(IGH - IGL) \quad (0 \leq e \leq 1)$$

The coefficient e as a dividing point of the differential period between upper and lower limit timing is rewritten dependent on the knock signal from the knock detector 34. When the knocking does not occur, the learning is performed once every predetermined period t1, for example, 1 second, to increase the coefficient e by a predetermined value a, thereby changing the rough learning quantity AT in the advance direction. On the other hand, the coefficient e is decreased by a predetermined value γ at every time when the knocking occurs. A knock counter 43 is fed with the knock signal to count occurrences of the knocking. When the knocking counts up to a predetermined number α, for example 5, the knock counter 43 produces an output signal which is applied to the rewriting section 41. A correcting quantity detector 44 is fed with the coefficient e to compare the quantity with 1. When the coefficient e reaches 1, a signal is fed to the rewriting section 41. The rewriting section 41 stops rewriting the coefficient e when either of the signals from the counter 43 or the detector 44 is fed, estimating that the ignition timing IGT has approached the desired maximum timing IGT'.

A fine correcting quantity learning operation is carried out thereafter. A fine learning correcting quantity AP is read out from a fine correcting quantity memory 45 storing a plurality of the fine learning correcting quantities AP which are arranged in accordance with the engine operating conditions. The fine learning correcting quantity AP is similarly increased or decreased by learning in the rewriting section 41 in dependency on the occurrence of the knocking. Thus, the ignition timing IGT is further advanced or retarded to approach the desired maximum timing IGT'.

The rough learning quantity AT calculated at the rough learning quantity calculator 48 and the fine learning correcting quantity AP which is rewritten and stored in the memory 45, respectively, are fed to a learning ignition timing calculator 46 where the learning ignition timing IGTL is calculated as follows.

$$IGTL = AT + AP$$

The learning ignition timing IGTL is fed to the ignition timing determining section 38 as described hereinbefore.

Figure 3:
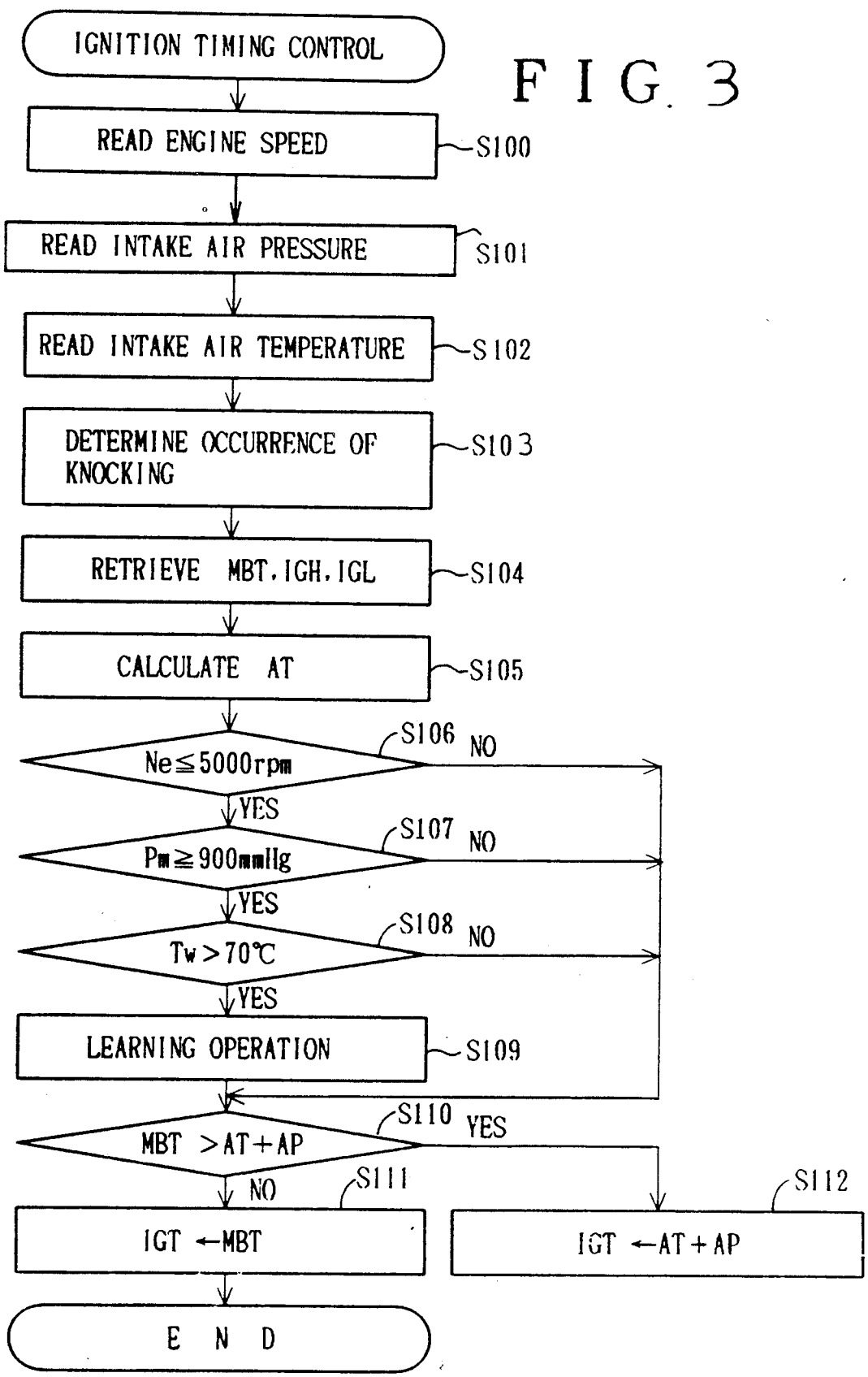
FIGS. 3 and 4 are flowcharts showing an operation of the system.
Figure 4:
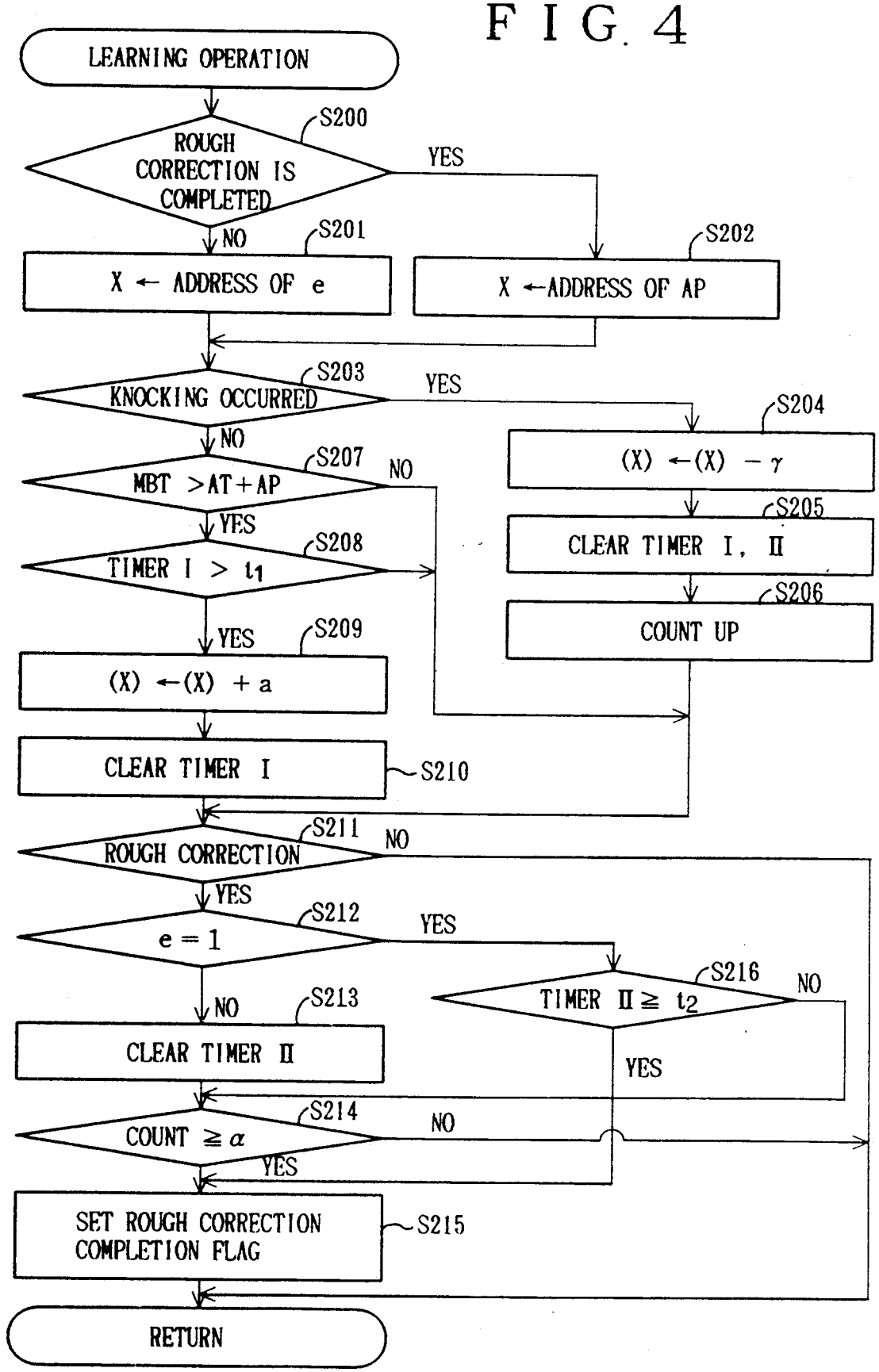

FIG. 3 shows the operation of the system in summary. When the program starts, the engine speed Ne, the intake air pressure Pm and the coolant temperature Tw are read out at steps S100 to S102. At a step S103, the occurrence of the knock is detected. Thereafter, at a step S104, the maximum advance ignition timing MBT and the upper limit ignition timing IGH, lower limit ignition timing IGL are read out from the respective tables 36, 47 and 35, in accordance with the engine speed Ne and the intake air pressure Pm. At a step S105, the rough learning quantity AT is calculated based on the upper and the lower limit ignition timings IGH and IGL. Steps S106 to S108 determine whether conditions for the learning are fulfilled. More particularly, improper conditions for learning, such as the engine is in cold state, or high engine speed range where the knock signal is liable to contain noises or low engine load range where the output of the sensors are low, are omitted at these steps. That is, it is determined whether the engine speed Ne is smaller than 5000 rpm (Ne≦5000 rpm), the intake pressure Pm is higher than 900 mmHg (Pm≧900 mmHg) and whether the coolant temperature Tw is higher than 70° C. (Tw>70° C.). When all of the answers at the steps S106 to S108 are YES, the program goes to a step S109 for the learning operation which is described in FIG. 4.

A step S200 determines whether the rough learning correction is completed. When the rough learning correction is not completed, an address of the coefficient e in the memory 42 is stored in an index register X at a step S201. The program proceeds to a step S203 where it is determined whether a knock has occurred during the program. When the occurrence of the knock is determined, the program proceeds to a step S204, and if not, proceeds to a step S207. At the step S204, the coefficient e is decremented by the predetermined correcting quantity γ. Timers I and II are cleared at a step S205 and the counter 43 counts up the occurrence of the knocking at a step S206.

On the other hand, at the step S207, the maximum advance ignition timing MBT is compared with the learning ignition timing IGTL (AT+AP). When the maximum advance ignition timing MBT is retarded more than the learning ignition timing IGTL, the learning operation is terminated, since the ignition timing IGTL exceeds the limit (maximum) advance ignition timing MBT. At a step S208, the timer I measures the period during which the knocking does not occur, and determination is made whether the engine has operated without causing the knocking for the predetermined period t1 (for example 1 second). If the present time is within the period t1, the learning is not executed. When the knocking has not occurred for the period t1, the coefficient e is incremented by the quantity a at a step S209, and the timer I is cleared at a step S210.

The following steps S211 to S215 are provided for determining the completion of the rough learning correction. At a step S211, it is determined whether the rough operation is still carried out. When the coefficient quantity e is smaller than 1 (e≧1) (step S212), the timer II is cleared at a step S213. At a step S214, it is determined that the rough correction is completed when the knocking has occurred more the predetermined number α (for example 5 occurrences) so that a rough correcting completion flag is set at a step S215.

When the rough learning correcting quantity AT reaches 1 (e≧1) (step S212), it is determined at a step S216 whether a predetermined period t2, for example 3 seconds, has passed since the start of the rough correction. The program is repeated to continue the rough correction when the predetermined period has not passed. When the period has passed, the program proceeds to the step S215.

When the rough learning correcting operation is completed, the program goes to a step S202 from the step S200 where an address of the fine correcting quantity AP is stored in the index register X. Thereafter, steps similar to the steps S203 to S210 are carried out. Namely, when a knocking occurs, the learning correcting quantity AP is decreased by a predetermined value. To the contrary, when the knocking does not occur, the correcting quantity AP is increased to advance the timing. When it is determined at the step S211 that the fine correction is carried out, the program is repeated as long as learning conditions are satisfied.

While the learning operation is performed, the program shown in FIG. 3 proceeds to a step S110, where it is determined whether the maximum advance ignition timing MBT is advanced more than the learning ignition timing IGTL which is the rough correcting quantity AT and the fine correcting quantity AP. When MBT is retarded more than IGTL (MBT≦IGTL), that is in a Da range in FIG. 5, the program goes to a step S111 to select the maximum advance ignition timing MBT as the ignition timing IGT. To the contrary, if MBT is advanced more than IGTL (MBT>IGTL), the learning ignition timing IGTL is determined at a step S112 as the ignition timing IGT. Thus, the ignition timing IGT close to the desired maximum timing IGT' can be obtained as shown by a bold line in FIG. 5.

In accordance with the present invention, the ignition timing is determined dependent on the limit ignition timing corresponding to the octane number of the fuel at a timing between the upper limit ignition timing and the lower limit ignition timing. Therefore, the real ignition timing approaches the desired timing, thereby preventing fluctuation of the ignition timing and improving the response of the control system. In addition, in a region where the learning ignition timing is advanced more than the maximum advance ignition timing, the ignition timing set to the upper limit ignition timing to effectively increase the engine torque. Moreover, although the maximum advance ignition timing changes in accordance with the octane number of the fuel used in the engine, the rough learning quantity can be properly controlled in dependency on the coefficient which is rewritten with the occurrence or the absence of the knocking.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A method for controlling ignition timing of an internal combustion engine having an ignition timing control system with a first memory storing a plurality of upper limit ignition timings and lower limit ignition timings each of which is a maximum advance timing for high-octane gasoline and low-octane gasoline without causing knocking, and storing a plurality of maximum advance ignition timings, and a learning control system having a second memory storing a coefficient for determining a dividing point between said upper and lower limit ignition timings, the method comprising the steps of:

deriving said upper limit ignition timing, said lower limit ignition timing, said maximum advance ignition timing, and said coefficient from said first and second memories in accordance with engine operating conditions;

rewriting said coefficient in accordance with occurrence of said knocking;

calculating a learning ignition timing from said upper and lower limit ignition timings and the coefficient;

comparing said learning ignition timing with said maximum advance ignition timing for determining a smaller advance timing; and determining the smaller advance timing as an ignition timing.

2. The method according to claim 1, wherein
the rewriting step of the coefficient in the advancing direction is stopped when the coefficient becomes one.

3. The method according to claim 1, wherein
said engine operating conditions are engine speed and load on the engine.

4. A system for controlling ignition timing of an internal combustion engine having an ignition timing control system with a first memory storing a plurality of upper limit ignition timings and lower limit ignition timings each of which is a maximum advance timing for high-octane gasoline and low-octane gasoline without causing knocking, and storing a plurality of maximum advance ignition timings, and a learning control system having a second memory storing a coefficient for determining a dividing point between said upper and lower limit ignition timings, the system comprising;

means for deriving said upper limit ignition timing, said lower limit ignition timing, said maximum advance ignition timing, and said coefficient from said first and second memories in accordance with engine operating conditions;

rewriting means for rewriting the derived coefficient in accordance with occurrence of said knocking of the engine;

a calculator for calculating a learning ignition timing from said upper and lower limit ignition timings and the coefficient; and a comparator for comparing said learning ignition timing with said maximum advance ignition timing for determining a smaller advancing timing as an ignition timing.

* * * * *